(12) United States Patent
Willson

(10) Patent No.: US 10,926,644 B1
(45) Date of Patent: Feb. 23, 2021

(54) COMPACT ELECTRIC VEHICLE FAST CHARGER WITH ENERGY STORAGE

(71) Applicant: James Willson, San Francisco, CA (US)

(72) Inventor: James Willson, San Francisco, CA (US)

( * ) Notice: Subject to any disclaimer, the term of this patent is extended or adjusted under 35 U.S.C. 154(b) by 375 days.

(21) Appl. No.: 15/425,754

(22) Filed: Feb. 6, 2017

Related U.S. Application Data

(63) Continuation of application No. 14/548,271, filed on Nov. 19, 2014, now abandoned.

(60) Provisional application No. 61/906,332, filed on Nov. 19, 2013.

(51) Int. Cl.
| | |
|---|---|
| *B60L 11/18* | (2006.01) |
| *H02J 7/00* | (2006.01) |
| *G06Q 30/02* | (2012.01) |
| *B60L 53/10* | (2019.01) |
| *B60L 53/14* | (2019.01) |

(52) U.S. Cl.
CPC ............. *B60L 11/185* (2013.01); *B60L 53/11* (2019.02); *B60L 53/14* (2019.02); *G06Q 30/0226* (2013.01); *H02J 7/007* (2013.01); *H02J 7/0021* (2013.01); *B60L 2230/16* (2013.01); *H02J 7/00045* (2020.01)

(58) Field of Classification Search
CPC ........ B60L 11/185; B60L 53/53; B60L 53/30; B60L 53/14; B60L 53/10; H02J 7/0021
USPC .................................................. 320/109, 112
See application file for complete search history.

(56) References Cited

U.S. PATENT DOCUMENTS

| | | | |
|---|---|---|---|
| 8,350,526 B2 * | 1/2013 | Dyer ................... | H01M 10/613 |
| | | | 320/109 |
| 9,290,103 B2 * | 3/2016 | Bianco ................ | B60L 11/1824 |
| 2008/0284375 A1 * | 11/2008 | Nagaoka ............... | H02J 7/0016 |
| | | | 320/116 |
| 2011/0055037 A1 * | 3/2011 | Hayashigawa ....... | B60L 3/0069 |
| | | | 705/26.1 |
| 2011/0276194 A1 * | 11/2011 | Emalfarb ................ | B60L 53/60 |
| | | | 700/297 |

* cited by examiner

*Primary Examiner* — Richard V Muralidar
(74) *Attorney, Agent, or Firm* — Law Office Of Michael O'Brien; Michael O'Brien

(57) ABSTRACT

Electronic or electrical systems and related methods provide a fast charging system for electrical vehicles and the like.

12 Claims, 11 Drawing Sheets

Front　　　Side

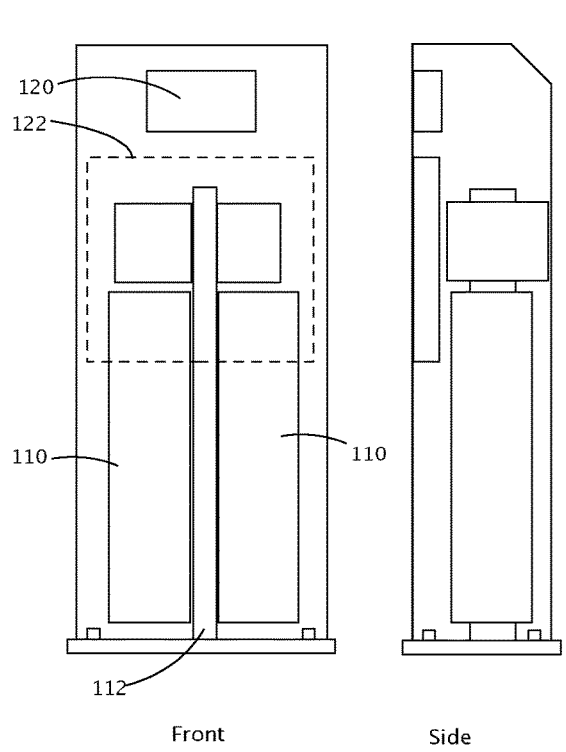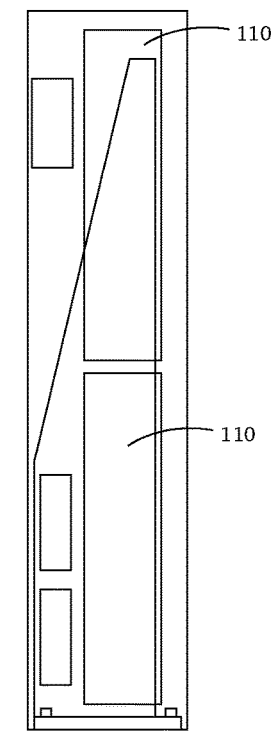
Fig. 8
Fig. 9

| Step | Type |
|---|---|
| Load time of day profile | Periodic |
| Calculate adjusted max energy to disburse | Periodic |
| Calculate adjusted max recharge time | Periodic |
| Idle | Background |
| Read transfer pack state of charge | Upon charge request |
| Disburse adjusted max energy | When charging |
| Read transfer pack state of charge | When re-charging |
| Return to idle | Background |

COMPACT ELECTRIC VEHICLE FAST CHARGER WITH ENERGY STORAGE

RELATED APPLICATION

This application is a continuation of non-provisional patent application U.S. Ser. No. 14/548,271 filed on Nov. 19, 2014 which, in turn, claims priority to provisional patent application U.S. Ser. No. 61/906,332 filed on Nov. 19, 2013, the entire contents of which is herein incorporated by reference.

BACKGROUND

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

DC fast chargers are becoming more prevalent as a means of charging electric vehicles. DC fast chargers can contain batteries, which allow the power delivered to an electric vehicle to be greater than that of the power source. An example of a battery-assisted DC fast charger is recited in U.S. Pat. No. 8,116,915, wherein the power source can be standard 110 or 220 Volt single phase power. Battery-assisted DC fast chargers are currently offered by companies such as Kanematsu.

Additionally, the batteries contained by DC fast chargers can be used batteries or battery modules (in the art at times referred to as "second life" batteries) obtained from electric vehicles and the like. This application for second life batteries is mentioned in a document posted on the Internet in 2010 by Susan DeFrietas describing work done by Duke energy and ITOCHU.

While various proposals for implementing rapid charging systems have been discussed, there is an ongoing need for novel systems and methods that provide features making them attractive for widespread installation.

SUMMARY

Specific embodiments of an electric vehicle fast charger herein are involved with various combinations of elements to create a novel charger. Among other features, specific embodiments can include: 1) a fast charge system to deliver a high power rate of charge to the vehicle, 2) a customary kiosk type of housing having a small footprint, 3) a battery pack, herein called a transfer pack, that is designed to be contained within the charger kiosk housing. Whereas traditional fast chargers require a high power, multi-phase connection to the grid, the charger of this invention is designed to use commonly available single phase power from traditional electrical service panels. According to specific embodiments, this allows a fast charger with the very important benefit of low installation cost and grid friendly operation.

Whereas existing battery-assisted fast chargers may have a separate module to house the batteries, chargers according to specific embodiments herein have batteries in the kiosk structure itself. In this disclosure, the kiosk is represented as a post or column as is commonly used for Level 2 charge stations; as a result, existing Level 2 charge stations can be easily and directly replaced by the charger of this invention. However, the housing may be of other designs having a similar small footprint.

The transfer pack according to specific embodiments, generally stores a fraction of a typical vehicle's total capacity and is intended to take advantage of short stops encountered by an EV driver to add an incremental charge to the vehicle. Using embodiments disclosed herein, an EV owner can "boost" the charge level by adding 10 to 15 miles to the vehicle's range when parking for as little as 10 minutes. The short charge time is particularly suited to retail and commercial locations. By comparison, a typical Level 2 charge station would generally add less than 3 miles during the same period.

According to specific embodiments, the transfer pack of this charge station generally stores four to eight kilowatt-hours to be dispensed to a vehicle. This energy can be transferred to the vehicle using a fast charge delivery method, after which a recharge is performed.

Specific embodiments incorporate a transfer pack comprised of used ("second life") battery modules obtained from electric vehicles and the like and employs a novel arrangement of these second life modules within the outline of a common charging kiosk.

Further specific embodiments incorporate multiple charge station shapes and form factors, optimized for particular types of lithium ion batteries including prismatic and pouch cell type devices. Such form factors include a tall vertical unit that comfortably fits the footprint of Level 2 charging stations and a wide form factor that is suitable for printed advertising or video displays.

Further specific embodiments can include one or more logic methods performed by a logic processor or controller; these logic methods being desirable in a charge station having limited stored energy capacity. As will be understood in the art, these logic methods are stored as logic instructions on a tangible digital storage medium or memory. Such logic methods include an operational method to calculate the amount of charge to be dispensed to the vehicle, with one of the functions of this method being to avoid fully depleting the transfer pack if possible. The amount of charge delivered to the vehicle can depend on a number of parameters, including the state of charge of the transfer pack and predicted usage based on time of day, so that rather than delivering the entire charge to one vehicle, an optimum number of vehicles can be serviced in a given period of time.

Further specific embodiments can include a mechanism for switching the charge mode from fast charge to Level 2 if it is desired to continue charging after depletion of the transfer pack.

Additional novel elements that may optionally be incorporated in some embodiments are a data interface and a user display that can be located within a host business, this interface containing a display indicating the amount of charge residing in the transfer pack and a means of manually controlling the charge dispensed to the vehicle.

According to further specific embodiments, a charger can be a stationary design or a portable design. In the portable design, the transfer pack and the charge delivery mechanism are incorporated into a single unit that can be used for auto repair shops and roadside service applications. This fast charge station would be useful when the vehicle is nearly depleted; that is, in emergency situations. In such situations, an owner may need only sufficient charge to get home or to travel to a full size charger.

This summary introduces a selection of concepts that are further described or can be further understood from this application as a whole, including the attached claims, read in light of the known art. This Summary is not intended to identify key features or essential features of the claimed subject matter, nor is it intended to be used to limit the scope of the claimed subject matter. The various innovations described herein are defined by the claims.

BRIEF DESCRIPTION OF THE FIGURES

The detailed description of some embodiments of the invention is made below with reference to the accompanying figures, wherein like numerals represent corresponding parts of the figures.

FIG. 8 illustrates a third embodiment of the charge station in which lithium polymer pouch type cells are used according to specific embodiments.

FIG. 9 illustrates a fourth embodiment of charge station containing lithium polymer pouch type cells or the like and showing internal components of the charge station.

DETAILED DESCRIPTION OF CERTAIN EMBODIMENTS

A specific embodiment of the charge station comprises a battery-assisted DC fast charger and a housing of a particular design. DC fast chargers bypass the vehicle's onboard charger and deliver a high charging current directly to the vehicle battery pack. DC fast chargers generally follow a predefined protocol to communicate with the vehicle and set the charging current.

Figure 1:
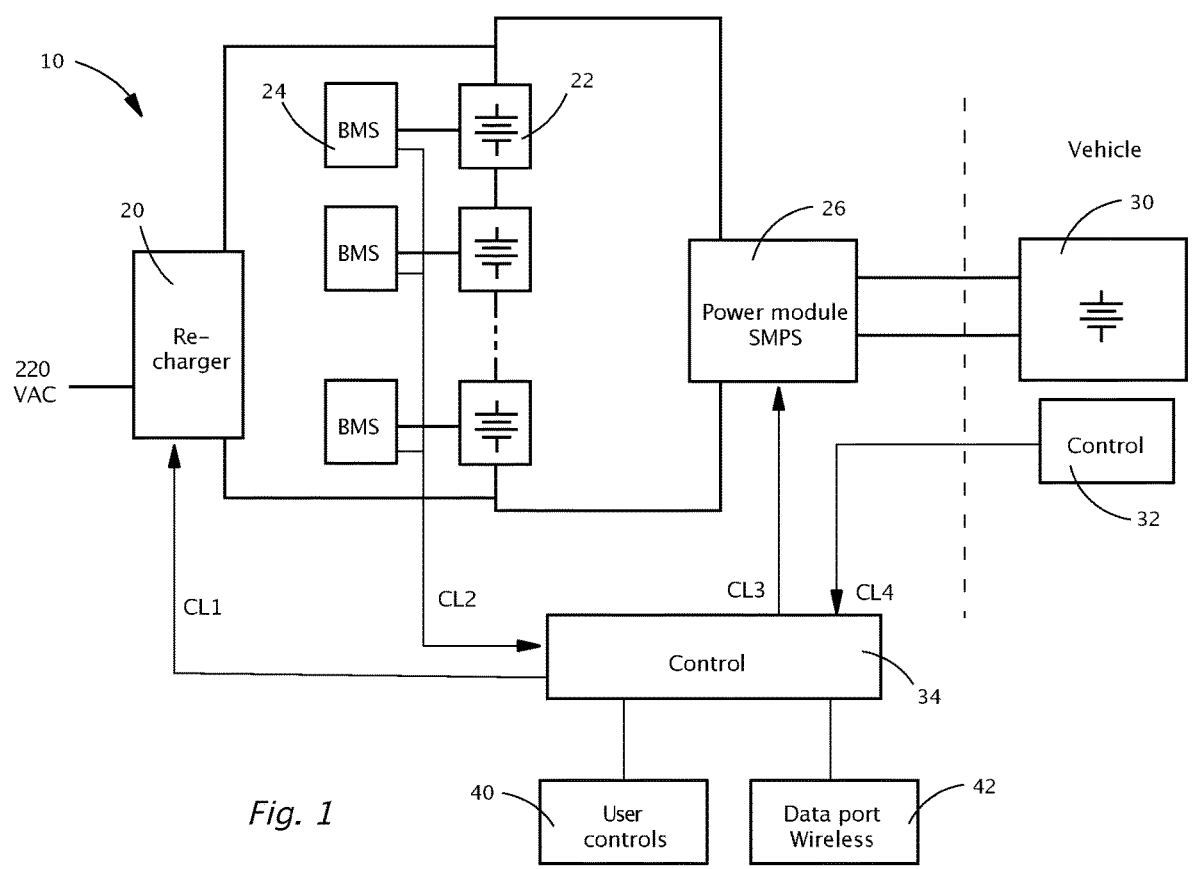
FIG. 1 illustrates an exemplary block diagram of a fast charger system according to specific embodiments showing the main electrical components.

FIG. 1 illustrates an exemplary block diagram of a fast charger system according to specific embodiments showing the main electrical components. Of course, many circuit topologies and battery arrangements are possible. The example fast charge station 10 comprises: a transfer battery pack charger 20, a transfer battery pack 22, at least one battery management system (BMS) modules 24, a power module 26 comprising a switch mode power supply that delivers current to the vehicle, a charge station control unit 34 running a supervisory program, a user control unit 40, and an optional data port 42 or wireless data interface. Shown for reference are the vehicle traction battery 30 and an associated control unit 32 whose purpose is to negotiate charging parameters with the charger station by means of a common protocol such as Chademo or J1772.

System control lines are represented as follows:
CL1—Re-charger enable/disable
CL2—BMS status lines
CL3—SMPS current setting and control
CL4—DC fast charge communication lines to/from the vehicle In a specific embodiment of the charge station, the battery modules are configured to fit in a kiosk structure substantially the size and shape of an existing Level 2 kiosk charge station. By doing so, such Level 2 kiosk charge stations can be easily replaced by the charge station of this disclosure. The battery modules are rated at approximately three to eight kWh according to specific embodiments, so as to deliver in one charge session a useful amount of charge to an electric vehicle, but typically less than the entire energy capacity of the electric vehicle. Of course, this description does not limit the energy capacity of the battery modules of this disclosure, as future batteries may be assumed to have increasing volumetric energy density over time.

When a charge station is designed to provide to a typical Battery Electric Vehicle (BEV) substantially less energy than the vehicle's storage capacity, the charger is herein called a "boost charger".

Figure 2:
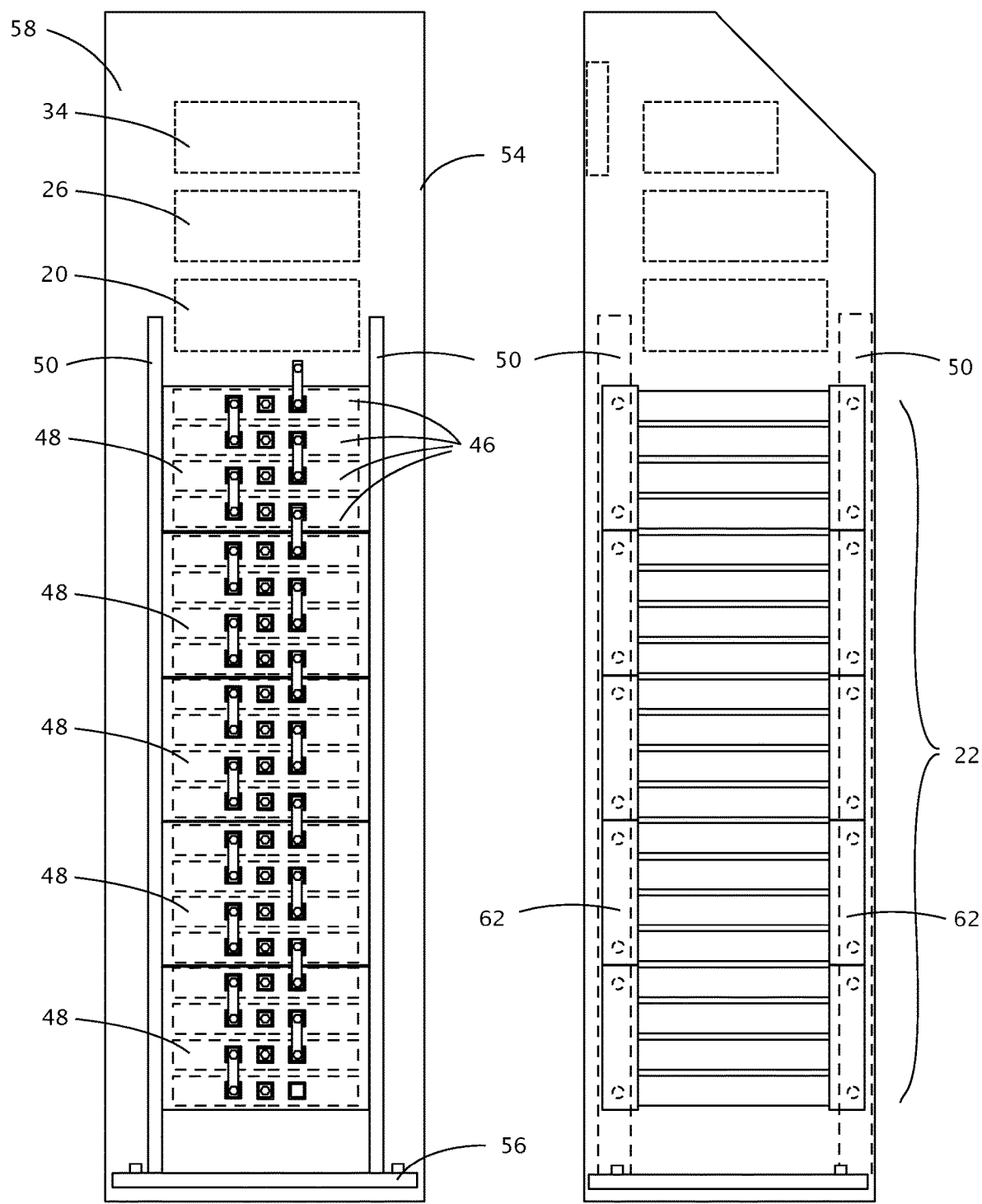
FIG. 2 is an internal view of a first embodiment of a charge station incorporating prismatic battery modules.

FIG. 2 is an internal view of a first embodiment of a charge station incorporating prismatic battery modules. The figure shows: a system component area 58 with system components shown approximately, a control unit 34 and a user display interface 120, a power module comprising a switch mode power supply assembly 26, a transfer battery pack 22 (including a battery management means), a transfer battery pack charger 20, a plurality of frame members 50, a charge station housing 54, a base 56, and mounting hardware. Not shown is the electrical cable and connector that connects the charge station to the vehicle charge port. In this disclosure, the transfer pack charger 20 may also be called a "re-charger" to distinguish it from the vehicle charge station 10.

An exemplary transfer pack according to specific embodiments is comprised of used ("second life") battery modules obtained from electric vehicles and the like. Whereas electric vehicle battery packs are typically replaced when storage capacity diminishes to 80% of initial capacity, these batteries are still useful for numerous stationary energy storage applications, including EV chargers. This embodiment uses prismatic modules of the type found in a Nissan Leaf, each module having nominal dimensions of 303 mm by 223 mm by 35 mm. The modules are stacked vertically and supported by frame members located to the sides. This embodiment is comprised of 20 modules or 40 individual cells, producing 152 Volts during a normal state of charge. This configuration requires the power module to be a boost mode DC-DC converter to charge vehicle battery packs up to 400 Volts.

Assuming that the second life battery modules have approximately 80% of their original capacity, the maximum available energy for this configuration is approximately 5000 Watt-hours. The usable energy is assumed to be 80% of this amount, for a usable energy of approximately 4000 Watt-hours. This capacity ensures the amount of charge supplied to the vehicle will be greater than 13% of a typical 30 kilowatt-hour vehicle battery capacity. Based on a common conversion rate of 3.5 miles per kilowatt, this arrangement can add more than 14 miles to the vehicle's range. Of course, other types of second use batteries, energy capacities, and arrangements are possible.

Whereas in the Nissan Leaf EV the batteries are placed on edge and stacked horizontally, according to specific embodiments, modules are stacked vertically in order to fit in a kiosk structure similar to an existing Level 2 kiosk. The modules cannot be stacked directly, one upon the other, as the module housings are made of thin sheet metal and the lower modules would have to support loads of up to 76 kg, the nominal weight of the pack. For this reason, this embodiment uses load supporting retainer assemblies of a particular design attached to the ends of the modules. This arrangement has the following advantages: 1) the module weight is transferred to and supported by load bearing side frame members 2) the modules can be divided into individual units, herein called "blocks" that can be lifted by a person for easier maintenance 3) the modules can be arranged in an alternating pattern (also called serpentine pattern) to simplify copper bus bar interconnections and 4) convective cooling can be implemented by providing space between modules. In the electric vehicle of the first use of the batteries, each module is placed in contact with the next, with no cooling passages between modules.

Figure 3:
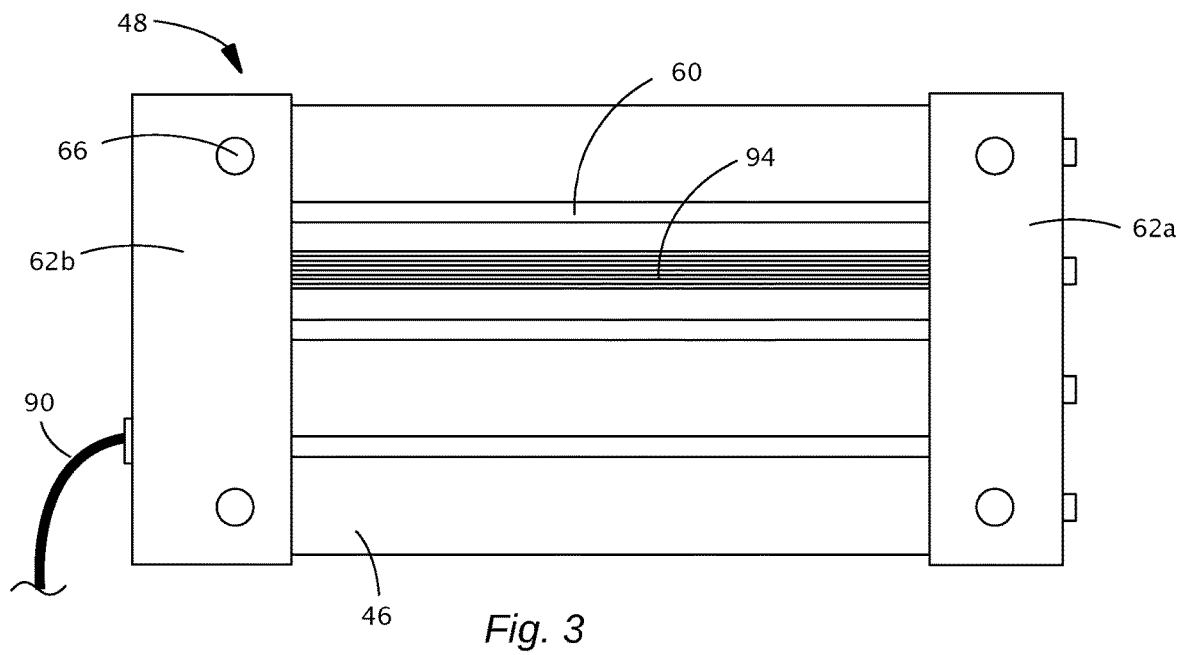
FIG. 3 illustrates a side view of an individual block 48 according to specific embodiments.
Figure 4:
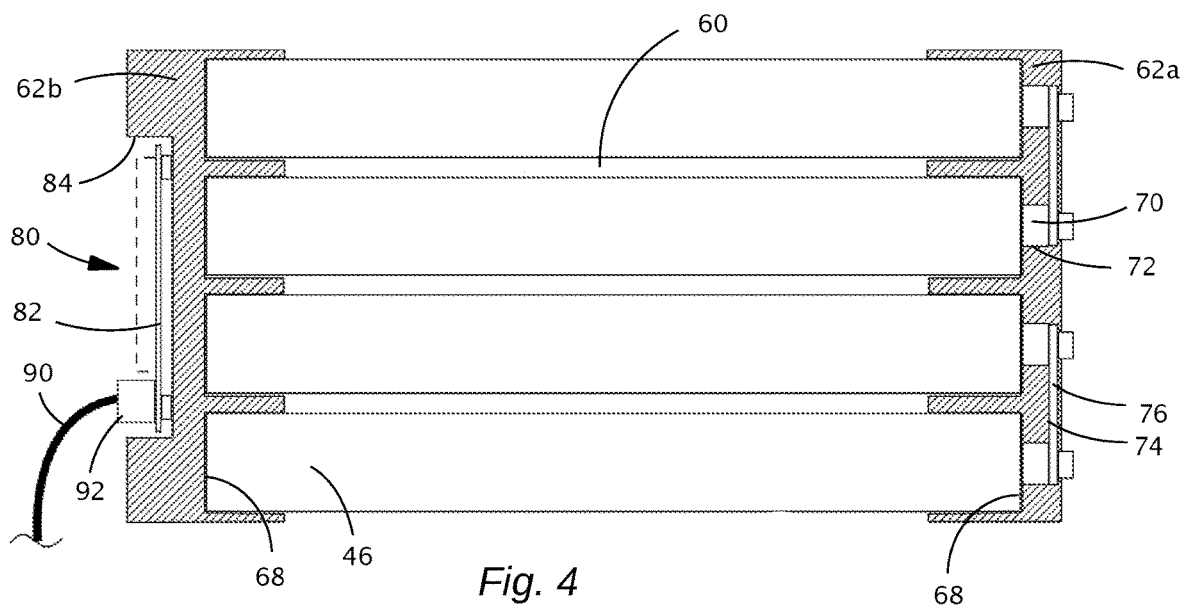
FIG. 4 illustrates a cross section side view showing a plurality of modules 46 and corresponding recesses 68 molded into the retaining assembly to accept the modules according to specific embodiments.

As shown in FIG. 2, the battery pack is comprised of five battery blocks 48, each block containing four Nissan Leaf modules 46. FIG. 3 is a side view of an individual block 48. Four modules 46 are held by retainer assemblies 62, which are positioned on each end of the modules, the retainer assemblies comprised of a front retainer 62a and a rear retainer 62b. In this embodiment, the retainers 62 are made of molded plastic such as polycarbonate. The retainers 62 position the modules so that there are flat passages 60 for convective cooling, as is described below. The retainers 62 have threaded holes or captive nuts 66 for mounting the blocks 48 to the frame members 50. The blocks 48 can also be retained by slides, similar to devices known in the art as "chassis slides". The weight of a single block, including four modules, is about 16 kg, which can normally be lifted by a repair technician. FIG. 4 is a cross section side view showing a plurality of modules 46 and corresponding recesses 68 molded into the retaining assembly to accept the modules. The figure shows the module terminals 70 and a plurality of recesses 72 molded into the retaining assembly to accept the terminals. Also shown are a plurality of bus bars 76 and corresponding recesses 74 molded into the retaining assembly to accept the bus bars.

Each battery block contains an integrated battery management system (BMS) that monitors the eight unit cells that make up the battery block. FIG. 4 shows a BMS controller module 80 comprised of a printed circuit board 82 mounted into a recess 84 in the retainer assembly 62b. A communication data line 90 is shown plugged into an RJ14 or similar jack 92, allowing the controller module to communicate with the system control module 34. Collectively the communication data lines from each battery block comprise the system control lines CL2 described above. Also shown in FIG. 3 is a ribbon cable 94 containing the eight individual cell sense lines connecting the cell terminals to the BMS controller module.

The BMS arrangement of this embodiment, called a modular topology, greatly simplifies system wiring, reducing the number of BMS lines from as many as 60 individual lines (including temperature sensing) to five RJ14 modular connections, and allowing the BMS connection to each battery block to be rapidly connected and disconnected for battery service and replacement. Of course, other BMS topologies are possible.

Figure 5:
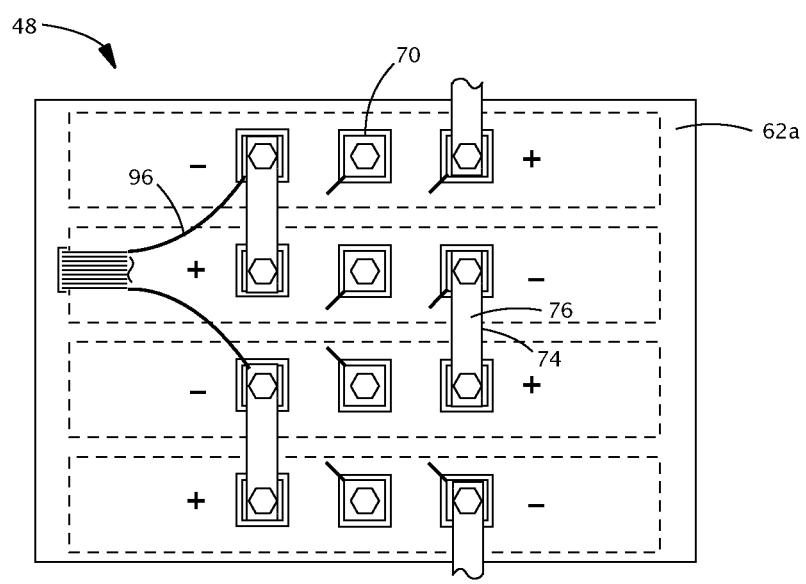
FIG. 5 is a front view of a battery block according to specific embodiments.

FIG. 5 is a front view of a battery block 48 showing the terminals 70 protruding from the retainer assembly 62a. Also shown are bus bars 76 interconnecting the modules and an approximation of the sense lines 96 leading to the BMS unit. The retainer assembly 62a has recesses 74 for the bus bars 76, the recesses holding the bus bars in place by means of friction fit during the assembly process. The retainer assembly 62a can also have recesses (not shown) for the BMS sense lines 96. The modules 46 are arranged in alternating polarities (also called serpentine pattern) allowing direct bus connections from one module to the next. The modules 46 are shown by phantom lines.

Figure 6:
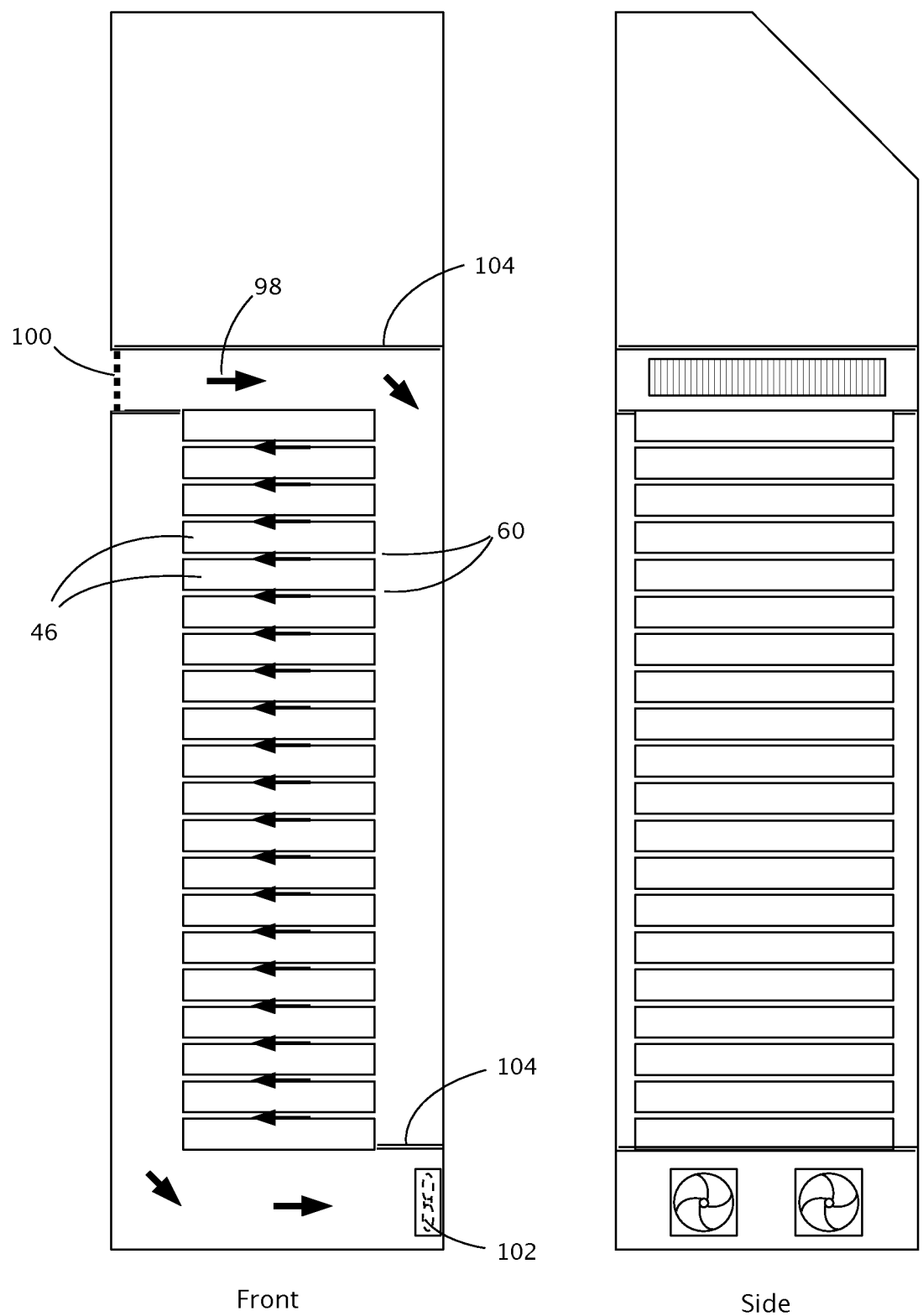
FIG. 6 illustrates an exemplary thermal management arrangement using air flow within the charge station according to specific embodiments.

FIG. 6 shows an exemplary thermal management arrangement using air flow within the charge station. Cooling air 98 is pulled through the grille opening 100, passes through the cooling passages 60 between the modules 46, and exits the charge station through the fan ports 102. Baffles 104 are used within the charger enclosure to route the cooling air. Of course there are many configurations for routing air through the station.

Figure 7:
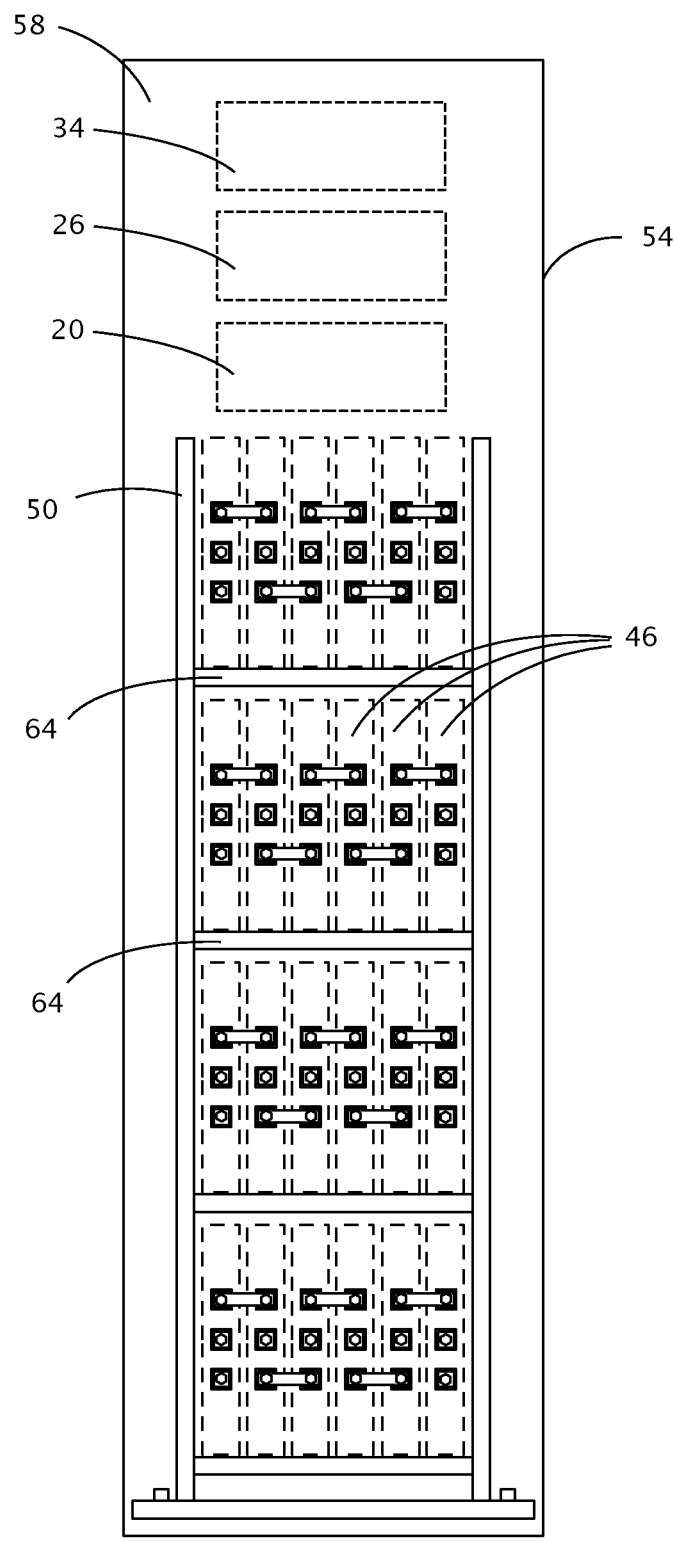
FIG. 7 illustrates a second embodiment of the charge station having an alternate arrangement of prismatic battery modules.

FIG. 7 illustrates a second embodiment of the charge station having an alternate arrangement of prismatic battery modules. In this embodiment the modules 46 are placed on edge and stacked horizontally and supported by cross members 64. The exemplary transfer pack of this embodiment is comprised of 24 modules or 48 individual cells, producing 182 Volts during a normal state of charge.

An additional embodiment of charge station incorporates smaller commonly available cylindrical lithium ion cells such as the 18650 and 26650 types. These cells may be arranged in any number of series-parallel configurations. An additional embodiment of charge station incorporates commonly available battery modules of the type used for stationary energy storage. For example, a plurality of Valence P40-24 24 Volt stationary battery modules could be used, these modules having high power density. An additional embodiment is a charge station intended for temporary or semi-permanent installation and having a removable connection to the electrical grid; for example, by incorporating a standard NEMA 14-30 or similar plug. Such embodiments may be useful for fairs, special events, system evaluation and testing, and the like.

FIG. 8 illustrates a third embodiment of the charge station in which lithium polymer pouch type cells are used according to specific embodiments. In this embodiment, there are two exemplary modules 110, each containing a predetermined number of cells (not visible) arranged in series and being encased in an insulating structure. The modules 110 are comprised of a left module and a right module, residing on opposite sides of a central support member 112. The lithium cells are of a Nickel Cobalt Manganese (NCM) composition for safety, low cost, and favorable energy density. This embodiment is comprised of 120 cells, producing 461 Volts during a normal state of charge and 403 Volts at the low charge limit. This allows use with vehicle battery packs of 400 Volts or less. This embodiment being relatively wide with respect to depth, also shown is a display area 122 that can be used for printed advertising, a video display, or the like.

With high power unit cells, the charger is capable of supplying 80 Ampere hours to the vehicle battery. The cells have a nominal capacity of 10 Ampere hours; therefore, the transfer pack energy capacity is approximately: 461 Volts× 10 Ampere-hours=4.61 kilowatt-hours. This capacity ensures the amount of charge supplied to the vehicle will be greater than 15% of a typical 30 kilowatt-hour vehicle battery capacity. Based on a common conversion rate of 3.5 miles per kilowatt, this arrangement can add more than 16 miles to the vehicle's range. Of course, other transfer pack capacities and arrangements are possible.

FIG. 9 illustrates a fourth embodiment of charge station containing lithium polymer pouch type cells or the like and showing internal components of the charge station. In this configuration, the modules 110 are placed vertically, resulting in the minimum footprint.

Figure 10:
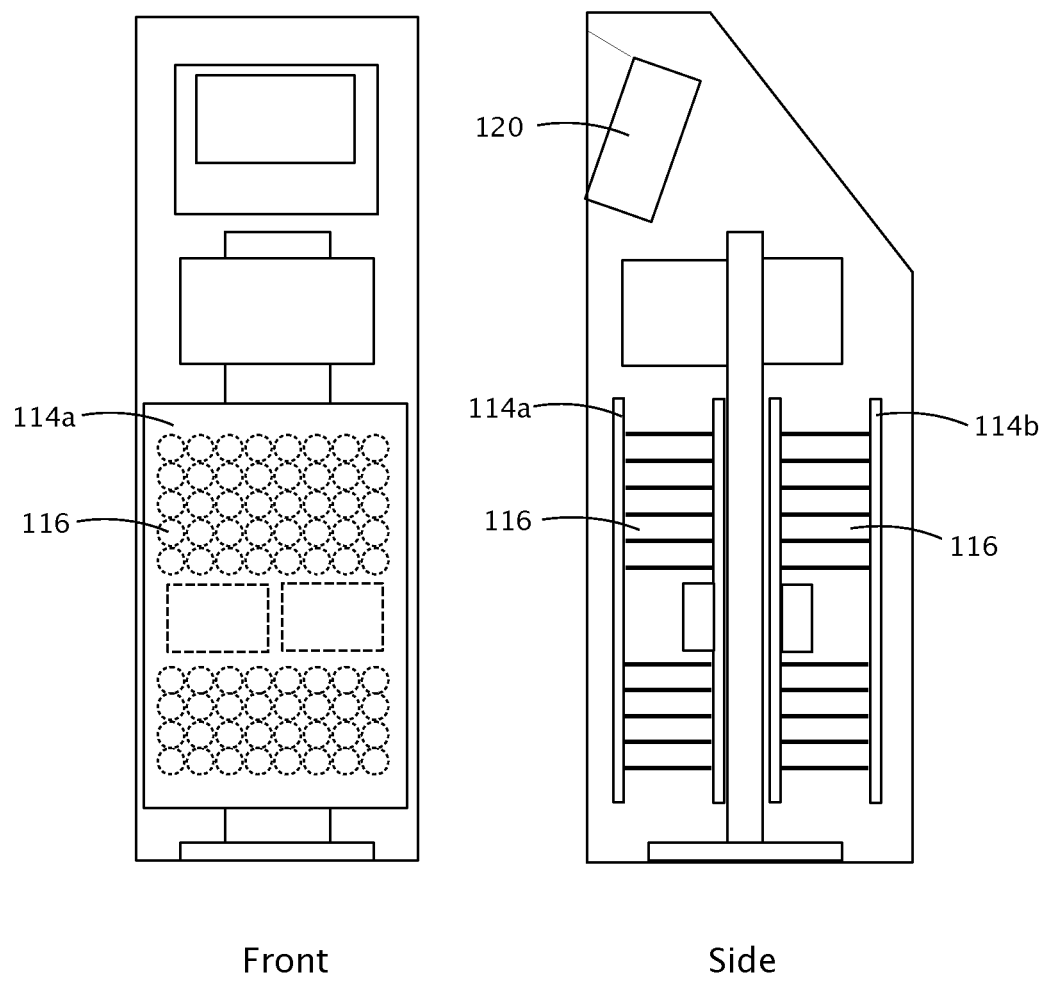
FIG. 10 illustrates a fifth embodiment of charge station containing cylindrical lithium ion cells and shows internal components of the charge station according to specific embodiments.

FIG. 10 illustrates a fifth embodiment of charge station containing cylindrical lithium ion cells and shows internal components of the charge station according to specific embodiments. The exemplary transfer pack is comprised of two modules 114, a front module 114a and a back module 114b, each module containing 72 cylindrical cells 116. Additionally, the figure shows a user interface 120 inclined and recessed, so as to improve viewability and provide some shade for the display. Not shown is an embodiment in which the shell or housing is the main supporting structure, also referred to as a monocoque design.

The unit cells of FIG. 10 are of a lithium iron phosphate chemistry or other safe composition. With 144 cells, this embodiment produces 461 Volts during a normal state of charge and 403 Volts at the low charge limit. A typical unit cell is a Headway 38120HP or equivalent having an eight Ampere-hour rating. The transfer pack energy capacity of this embodiment is: 461 Volts×8 Ampere-hours=3.69 kilowatt-hours.

The charge station of this invention can be also connected via a network to a third party central management service that handles user authentication, billing, and similar tasks. FIG. 1 shows a data port through which this connection is made. The communication can follow a proprietary protocol or a standard protocol such as Open Charge Point Protocol (OCPP).

Some embodiments of this charge station include a display that can report the amount of charge residing in the transfer pack at a given time and the estimated wait time to the next charge, if applicable. As described below, further embodiments of this invention can include a remote module that can be located on the premises of host business and can display similar information. Similarly, a means of manually controlling the charger can be implemented so that a business owner can override automatic settings.

Switchable Fast Charge/Level 2

Some embodiments of this charge station include a system topology in which the operating mode can be switched to either transfer pack recharge mode or Level 2 charge mode. In this case, the charge station could continue to charge the vehicle after the transfer pack is depleted, although at a slower rate. This instruction could be commanded 1) directly by a user or 2) by the supervisory program running preferences in the system control module, or 3) via a network from a central management service.

Figure 11:
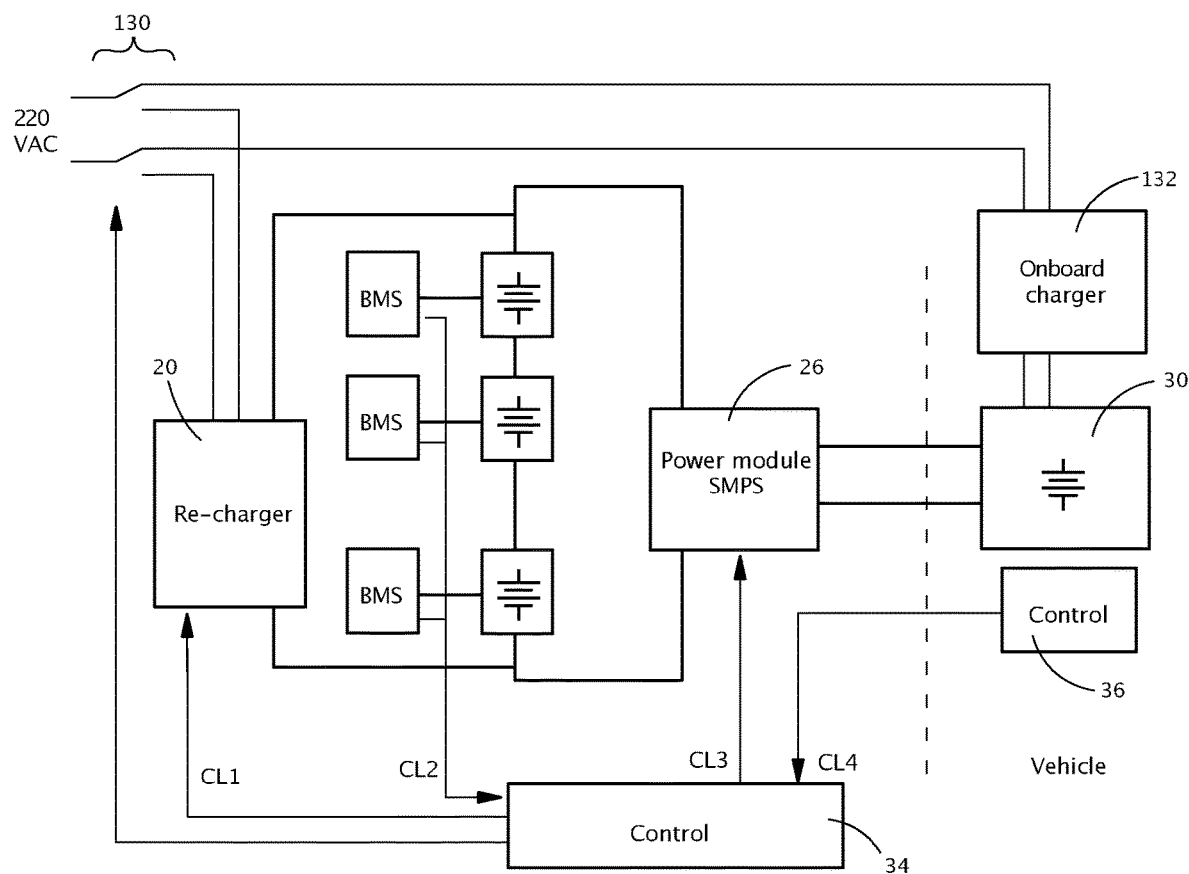
FIG. 11 illustrates a power switching arrangement according to specific embodiments.

FIG. 11 illustrates a power switching arrangement according to specific embodiments. FIG. 11 shows switch 130 wherein the 220 Volt input power can be directed to either of two loads: 1) the transfer pack recharger unit 20, in which case the charge station would not be available to charge an EV, or 2) an onboard vehicle charger 132 via a J1772 Level 2 vehicle interface. This interface, referred to in the art as an "SAE combo port" is especially suited to this option, as it contains both the Level 2 interface and the fast charge interface in one connector; therefore it would be unnecessary to change couplers at the vehicle.

Charge Metering

Boost charge stations, having limited amounts of stored energy, may benefit from charge metering, wherein the logic processor or controller determines an optimum amount of charge to be dispensed to a vehicle by means of an algorithm and subsequently delivers that amount of charge to the vehicle. Charge metering may be advantageous in retail and commercial locations where the time that a customer performs a transaction with a business is relatively short and it is desirable to maintain quick turnaround of the available electric vehicle charging area.

To implement charge metering, the charge station of this disclosure may perform one or more of the following: 1) terminate vehicle charging before the transfer pack is fully depleted and 2) delay charging of a subsequent vehicle by a predetermined length of time to allow recharging of the transfer pack. It is not necessary for the recharge delay time to accommodate full charging of the transfer pack; it is only necessary for the charge station of this disclosure to provide a useful amount of charge to the subsequent vehicle. Charge metering is controlled by the charger control unit, the control unit containing a microprocessor or the like and executing program code residing in the control unit. The charger control unit enables and disables the power module by means of control line CL3.

An operational method presented herein calculates the amount of charge to be dispensed to the vehicle and the recharge delay time. Some objectives of this method are to maximize the likelihood that the charger will be available when a subsequent vehicle arrives at the charge station and to use the limited energy capacity contained by the battery modules most effectively.

Figures 12, 13:
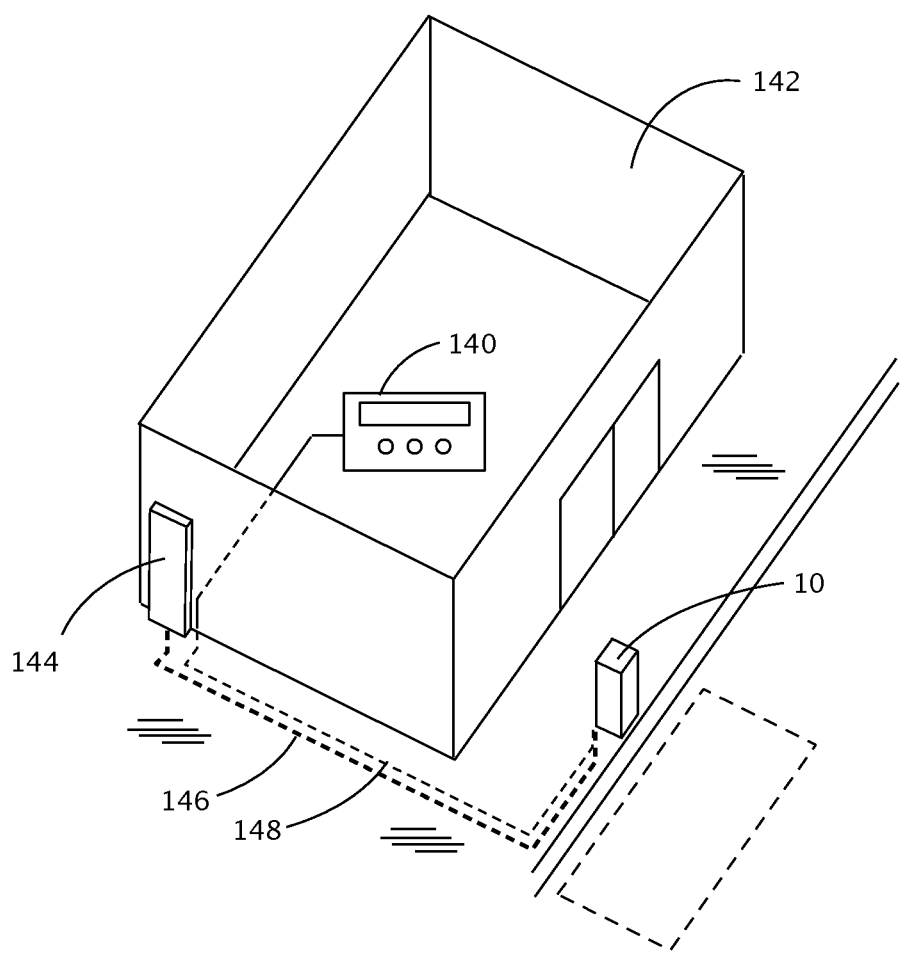
FIG. 12 is a flow chart illustrating an exemplary method by which a microprocessor can implement charge metering according to specific embodiments.
FIG. 13 illustrates an arrangement of an on-site interface according to specific embodiments.

FIG. 12 is a flow chart illustrating an exemplary method by which a microprocessor can implement charge metering according to specific embodiments. Example steps according to example specific embodiments comprise:

1. Loading day of week and time of day profile. This profile is used to adjust the dispensed charge energy and recharge times to reflect increased demand during predetermined days of the week and times of the day.

2. Calculating the energy to be dispensed to the vehicle. This energy may or may not be the entire contents of the transfer pack, and is herein referred to as "adjusted dispensed energy".

3. Calculating the minimum energy to which the transfer pack will be charged in the event that a subsequent vehicle submits a charge request soon after a first vehicle. This energy determines the "wait time" experienced by the subsequent vehicle before charging can begin, and may or may not be the entire capacity of the transfer pack. This energy is herein referred to as "adjusted recharge energy".

4. Waiting for a vehicle charge request and re-charging the transfer pack if necessary.

5. After receiving a charge request, reading transfer pack state of charge.

6. Performing one of: a) dispensing the adjusted charge energy to the vehicle, or b) delaying the charge session while supplying at least the adjusted recharge energy to the transfer pack, and then dispensing the adjusted charge energy to the vehicle. The charge "on" time Ton required to dispense the adjusted charge energy may vary from vehicle to vehicle, depending on the charge current negotiated by the charge station and the vehicle, according to the DC fast charge protocol.

7. After the adjusted charge energy is transferred, terminating the charge session.

8. Returning to step four.

9. Periodically returning to step one.

The adjusted dispensed energy (the energy delivered to vehicle per charge) can be determined from the desired charge/discharge cycle time and the power available from the AC service and the power delivered to the vehicle. The adjusted dispensed energy must be less than the capacity of the transfer pack, but is otherwise independent of the capacity of the transfer pack.

An exemplary method of providing an optimal adjusted dispensed energy is as follows:

1. Dividing the desired cycle time by the sum of the inverse of the input power and the inverse of the output power.

2. Incorporating the adjusted dispensed energy into the program code and adjusting the adjusted dispensed energy as required to compensate for varying demand according to day of the week and/or time of day For example, if the desired cycle time is 40 minutes, and power available from the AC service is 5.5 kW, and the power delivered to the vehicle is 30 kW, then a suitable adjusted dispensed energy is: Ead=0.67 hour/(1/5.5+1/30)= 3.19 kW.

On Site Interface Module

Boost charge stations in particular may need intervention from a property owner or host business employee to manage the usage of the station; that is, to enable charging, disable charging, determine how long a space has been occupied, override charge metering, and the like. The host business owner may not want to use a personal computer or the like connected via a network to a third party service provider to provide these functions. It may be desirable to provide the host business with a dedicated remote user interface module, herein called an "on site interface". The on site interface can contain a means of displaying the charge station status and can incorporate a basic function set required to manually control the boost charger. The on-site interface can be located on the host business premises and can connect directly to the charge station using dedicated wiring or by wireless means.

FIG. 13 illustrates an arrangement of an on-site interface according to specific embodiments. In the figure, a charge station 10 of the current disclosure is located near a retail business 142 and draws power from a nearby AC service panel 144. In addition to the AC supply cable, 146, a control cable 148 passes from the charge station 10 to the business premises 142. In an exemplary embodiment of the on-site interface, both cables can reside underground, and may be installed substantially in the same trench. In a further exemplary embodiment of the on-site interface, the control cable is shown connecting to an interface module 140 that resides inside the business premises.

Some of the functions of on-site interface include, but are not limited to: 1) monitoring status of the charger, including transfer pack state of charge, and 2) providing a manual control that can enable and disable the charger and override the charge metering function.

Some exemplary embodiments of the on-site interface of this disclosure include one or more of the following: 1) The on-site interface can substantially replace the microprocessor control unit of the prior description of the charge station. An advantage of this arrangement is that software updates and maintenance of the control circuitry can be performed without opening the charge station housing. 2) The on-site interface can connect to the host business data network. 3) The on-site interface can be comprised of an embedded processor, including devices such as an Arduino, Raspberry Pi, and the like. 4) The on-site interface can be comprised of a personal computer (PC) and the charger can be controlled by an application running on the PC. 5) A user display can be comprised of a standard flat panel monitor, a touch screen display, or other common display device. In this case, a sophisticated and easy to read user interface can be implemented. 6) The data connection from the charge station to the host business can be comprised of standard serial communication lines, Ethernet, fiber optic, or other common physical interface. This connection means may be preferable for new installations. 7) The data connection from the charge station to the host business can be comprised of a wireless connection. This connection means may be preferable for replacement installations, notably when replacing Level 2 charge stations with DC fast chargers disclosed herein.

Figure 14:
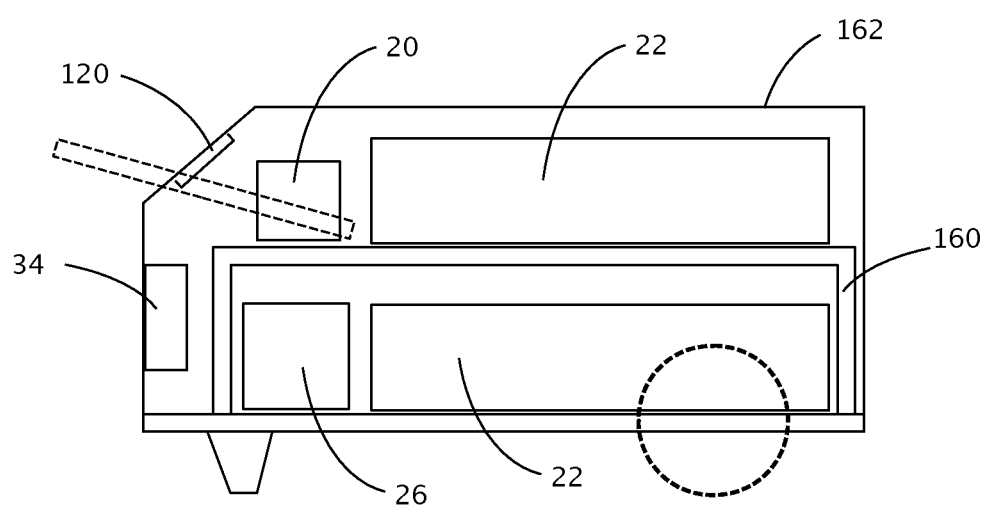
FIG. 14 illustrates is an internal view of a portable charger according to specific embodiments.

FIG. 14 illustrates is an internal view of a portable charger according to specific embodiments. The figure shows: a control unit 34, a user display interface 120, a power module 26 employing switch mode power supply circuitry, a transfer battery pack 22 including at least one battery management unit, a transfer pack charger assembly 20, a support frame 160, and a charger housing 162 including wheels and a handle.

Existing Kiosk Replacement or Enhancement

According to further specific embodiments, a method is provided to facilitate easy upgrading of an existing Level 2 charging kiosks by replacing the existing Level 2 kiosk with a charger as described herein. In some embodiments, this may be accomplished by replacing an existing Level 2 housing with a charger and housing according to specific embodiments that fits into a footprint available for the Level 2 housing.

CONCLUDING REMARKS

It is well known in the art that systems and methods such as described herein can include a variety of different components and different functions in a modular fashion. Different example specific embodiments and implementations can include different mixtures of elements and functions and may group various functions as parts of various elements. For purposes of clarity, embodiments of the invention are described in terms of systems that include many different innovative components and innovative combinations of innovative components and known components. No inference should be taken to limit the claimed invention to combinations containing all of the innovative components listed in any illustrative embodiment in this specification. Reference herein to an embodiment having a particular feature and reference elsewhere herein to another embodiment having a different feature does not exclude from this disclosure embodiments which have both features or all features described herein, unless such exclusion is expressly stated herein.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Thus, the general structure and techniques, and more specific embodiments that can be used to effect different ways of carrying out the more general goals are described herein. Although only a few embodiments have been disclosed in detail herein, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An electric vehicle charging station apparatus for upgrading a Level 2 charging station to a DC fast charging station; the electric vehicle charging station apparatus comprising:
   a housing, further comprising operational elements of the Level 2 charging station and having a tall and narrow aspect ratio;
   a transfer battery pack comprising one or more charge storage devices, said transfer battery pack located toward a bottom surface of the housing, causing a lower center of gravity for the electric vehicle charging station apparatus;
   a power input interface, controllably connected to a battery charger and configured to operate from a nominal 220 VAC single phase power; wherein the battery charger is configured to deliver charge to said transfer battery pack, the power input interface further comprising connections located near the bottom surface to facilitate connection to an existing 220 V AC feeder at a ground surface level;
   a power output interface, configured to removably connect to a fast charge input port of an electric vehicle;
   a power module configured to controllably deliver power from the transfer battery pack to the power output interface; said power module being located near a top surface of the housing, wherein heat is routed to ambient air and the heat does not impinge upon the transfer battery pack;
   a digital controller; having logical instructions to control the charging station; and
   a communication interface operationally connected to the digital controller;
   wherein the electrical vehicle charging station apparatus is configured to be installed in a space occupied by the Level 2 charging station.

2. The electric vehicle charging station apparatus of claim 1, wherein the transfer pack comprises at least one battery block, wherein each battery block comprises a plurality of substantially prismatic battery modules, each substantially prismatic battery module comprises at least one rechargeable battery cells and further has terminals at one end.

3. The electric vehicle charging station apparatus of claim 2 wherein each member of the plurality of substantially prismatic battery modules is of a type found in commercially available battery electric vehicles.

4. The electric vehicle charging station apparatus of claim 2 wherein the at least one battery block is removably secured to load bearing frame members.

5. The electric vehicle charging station apparatus of claim 2 wherein the at least one battery block is secured to load bearing frame members by means of slides.

6. The electric vehicle charging station apparatus of claim 2 wherein the at least one battery block comprises at least one retainer assembly.

7. The electric vehicle charging station apparatus of claim 6 wherein the at least one retainer assembly is molded from rigid plastic and contains recessed features to retain the at least one battery block and to engage the plurality of substantially prismatic battery modules.

8. The electric vehicle charging station apparatus of claim 6 wherein the at least one retainer assembly contains battery management system circuitry.

9. The electric vehicle charging station apparatus of claim 6 wherein each module is spaced a predetermined distance from the next, whereby cooling passages are established between the plurality of substantially prismatic battery modules.

10. The electric vehicle charging station apparatus of claim 1 wherein the transfer pack comprises at least one substantially prismatic battery module, each substantially prismatic battery module comprised of a plurality of rechargeable battery cells.

11. The electric vehicle charging station apparatus of claim 10 wherein the at least one substantially prismatic battery module is secured to at least one central support member disposed vertically.

12. The electric vehicle charging station apparatus of claim 10 wherein the housing is a main supporting structure for the DC fast charger.

* * * * *